(12) United States Patent
Schumacher (10) Patent No.: US 11,470,688 B2
(45) Date of Patent: Oct. 11, 2022

(54) METHODS AND SYSTEMS FOR BRIDGING FOR MOBILE COMMUNICATIONS SYSTEMS

(71) Applicant: Swisscom AG, Bern (CH)

(72) Inventor: Adrian Schumacher, Bern (CH)

(73) Assignee: SWISSCOM AG, Bern (CH)

( * ) Notice: Subject to any disclaimer, the term of this patent is extended or adjusted under 35 U.S.C. 154(b) by 0 days.

(21) Appl. No.: 17/317,512

(22) Filed: May 11, 2021

(65) Prior Publication Data
US 2021/0368583 A1    Nov. 25, 2021

(30) Foreign Application Priority Data

May 25, 2020   (EP) ..................... 20176343

(51) Int. Cl.
*H04W 92/20* (2009.01)
*H04W 52/02* (2009.01)
*H04W 64/00* (2009.01)

(52) U.S. Cl.
CPC ....... *H04W 92/20* (2013.01); *H04W 52/0203* (2013.01); *H04W 64/003* (2013.01)

(58) Field of Classification Search
CPC ........................... H04B 7/2678; H04B 7/2675; H04B 7/15507; H04B 7/2612; H04B 7/155; H04B 7/15542; H04L 5/1469; H04L 5/005; H04L 5/14; H04L 27/26; H04L 5/0064; H04L 27/26025; H04L 5/0032; H04L 27/2602; H04L 5/0023; H04L 5/0048; H04L 5/0003; H04W 72/0446; H04W 72/042; H04W 72/0413; H04W 84/005; H04W 16/20;
(Continued)

(56) References Cited

U.S. PATENT DOCUMENTS 9,282,565 B2 *   3/2016   Mildh ............... H04W 56/0045
9,907,099 B2 *   2/2018   Masini .................. H04W 48/18
(Continued)

FOREIGN PATENT DOCUMENTS

GB        2569981 A       7/2019

OTHER PUBLICATIONS

Rui Zhu et al., "Millimeter-Wave to Microwave MIMO Relays (M4R) for 5G Building Penetration Communications", 3 pages.
(Continued)

*Primary Examiner* — Jung Liu
(74) *Attorney, Agent, or Firm* — McAndrews, Held & Malloy, Ltd.

(57) ABSTRACT

A bridge may include a donor bridge node and one or more service bridge nodes. The donor bridge node may be configured to connect to a base station pooling location comprising a plurality of cell signals, determine for each cell signal a service link carrier frequency in a service link frequency band and a bridge link carrier frequency in a bridge link frequency band, associate each cell signal and the determined carrier frequencies in the service link frequency band and in the bridge link frequency band with the one or more service bridge nodes, and communicate each cell signal at the bridge link carrier frequency of the cell signal. The service bridge nodes may communicate with the donor bridge node at the carrier frequency of the bridge link frequency band and with user equipment in the service link carrier frequency band of the service link frequency band.

19 Claims, 5 Drawing Sheets

(58) Field of Classification Search
CPC ......... H04W 72/1215; H04W 72/1289; H04W 16/225; H04W 72/1284; H04W 88/085
See application file for complete search history.

(56) References Cited

U.S. PATENT DOCUMENTS

| | | | | |
|---|---|---|---|---|
| 10,326,522 | B1* | 6/2019 | Khan | H04B 7/2678 |
| 2016/0360511 | A1* | 12/2016 | Barzegar | H04L 5/0048 |
| 2019/0110304 | A1* | 4/2019 | Khan | H04L 27/26 |
| 2021/0084603 | A1* | 3/2021 | Zisimopoulos | H04L 5/0048 |
| 2021/0307029 | A1* | 9/2021 | Uchiyama | H04W 72/0446 |
| 2021/0314930 | A1* | 10/2021 | Uchiyama | H04W 12/08 |
| 2021/0329498 | A1* | 10/2021 | Tang | H04W 72/08 |
| 2022/0053581 | A1* | 2/2022 | Tsuda | H04W 48/14 |

OTHER PUBLICATIONS

Sudip Biswas et al., "On the Performance of Relay Aided Millimeter Wave Networks"; 13 pages.
Fraunhofer-Institute for Integr. Circuits (IIS), "UE-Side Virtual MIMO Using MM-Wave for 5G", 20 pages.
A. Schumacher, R. Merz and A. Burg, "A mmWave Bridge Concept to Solve the Cellular Outdoor-to-Indoor Challenge," 2020 IEEE 91st Vehicular Technology Conference (VTC2020-Spring), Antwerp, Belgium, 2020, pp. 1-6, doi: 10.1109/VTC2020-Spring48590. 2020.9128458; Date of Conference: May 25-28, 2020; Date Added to IEEE Xplore: Jun. 30, 2020; https://ieeexplore.ieee.org/document/9128458, 6 pages.
Extended European Search Report for EP20176343.0, dated Oct. 30, 2020, 20 pages.

* cited by examiner

METHODS AND SYSTEMS FOR BRIDGING FOR MOBILE COMMUNICATIONS SYSTEMS

CLAIM OF PRIORITY

This patent application claims benefit of, the filing date of, and right of priority to European (EP) Patent Application Serial No. 20176343.0 filed May 25, 2020. The above identified application is hereby incorporated herein by reference in its entirety.

BACKGROUND

The present disclosure relates to communication solutions. In particular, various embodiments in accordance with the present disclosure relate to methods and systems for bridging for mobile communications systems. In this regard, conventional solutions for providing bridging may be costly, cumbersome, and/or inefficient—e.g., may be too complex and/or too time-consuming to implement, may not operate effectively, etc.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Systems and/or methods are provided for bridging for mobile communications systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the disclosure will become apparent from the following description of non-limiting exemplary embodiments, with reference to the appended drawings, in which.

DETAILED DESCRIPTION

As utilized herein the terms "circuits" and "circuitry" refer to physical electronic components (e.g., hardware), and any software and/or firmware ("code") that may configure the hardware, be executed by the hardware, and or otherwise be associated with the hardware. As utilized herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Certain example implementations in accordance with the present disclosure may be found in systems and methods for bridging for mobile communications systems, as described below in more detail with reference to the attached figures. In this regard, data consumption in mobile cellular networks is increasing. The capacity of mobile communications network may be increased, such as by reducing cell sizes of the network cells and by densifying the network by deploying more base stations. However, deploying more base stations is costly and may not be always feasible due to limited availability of new cell sites.

The millimeter wave (mmWave) spectrum refers to the spectrum in the range of 30 GHz to 300 GHz. With New Radio (NR), the 3rd Generation Partnership Project (3GPP) has standardized the radio access technology (RAT) for the 5th generation (5G) of mobile cellular communications, which may also operate in the mmWave spectrum, more precisely in the frequency range of 24.25 GHz to 52.6 GHz with Release 15 and even up to 71 GHz starting with Release 17.

However, propagation distances of radio frequency (RF) signals on the millimeter wave spectrum are shorter than the propagation distances of radio frequency signals in lower frequency bands that include legacy frequencies below 6 GHz (sub-6 GHz) frequencies. The radio frequency signals on the millimeter wave spectrum (mmWave signals) experience a much higher attenuation when penetrating into buildings compared to frequencies below 6 GHz. While the attenuation of certain building materials, such as wood, plasterboard, and drywall, does not change much with an increasing radio frequency (RF), it may significantly increase for brick and concrete walls. Line-of-sight is therefore often required between the transmitter and receiver for communications using mmWave signals.

Figure 1:
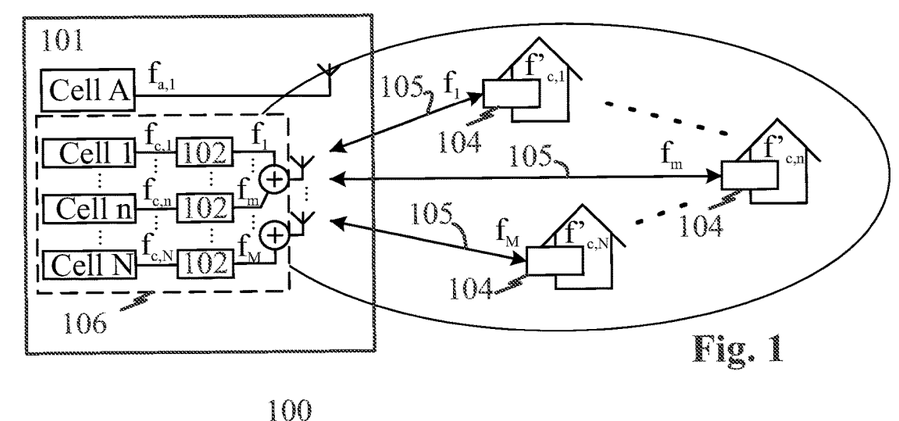
FIG. 1 illustrates an example of a system in accordance with at least some embodiments of the present invention.

FIG. 1 illustrates an example of a system in accordance with at least some embodiments of the present invention. Shown in FIG. 1 is system 100. In this regard, the system 100 comprises one or more base stations 101 for providing wireless radio access to user equipment (UE) via cells (Cell A). Each base station 101 may comprise suitable circuitry for implementing base station related functions and/or operations, as well as all functions and/or operations attributed thereto (or any component thereof) in accordance with various aspects of the present disclosure.

The system 100 may be mobile communications system or a part of a mobile communications system. The system may be implemented in accordance with, for example, a 4th generation (4G), 5th generation (5G) or later generations of mobile cellular communications systems. Accordingly, the one or more base stations 101 may be configured to communicate in accordance with 4G Long Term Evolution (LTE) or 5G New Radio (NR), future 6G, WLAN, or another widely used wireless communication system.

A bridge may be connected to the one or more base stations 101 for front-hauling at least part of the cells of the base stations to indoor or outdoor locations that are remote from the base stations and where enhanced capacity is needed for serving the UE. The bridge comprises a donor bridge node 102 and one or more service bridge nodes 104 that are connected by bridge links 105. In this regard, each donor bridge node 102 and service bridge nodes 104 may comprise suitable circuitry for implementing bridging related functions and/or operations, as well as all functions and/or operations attributed thereto (or any component thereof) in accordance with various aspects of the present disclosure.

The service bridge nodes may be deployed at locations where capacity enhancement of the system is needed. Locations where enhanced capacity is needed comprise at least locations of poor coverage and locations outside of the coverage area of the base station. The service bridge nodes may be connected to UE over wireless radio links, e.g., service links.

At least part of the cells, Cell A, of the one or more base stations 101 provide wireless radio access at the base station sites. However, at least part of the cells, Cell 1, Cell, n, Cell N, of the base stations may be front-hauled by the bridge over the bridge links 105 to the locations of the service bridge nodes for providing capacity enhancement.

The donor bridge node 102 may be connected to the one or more of the base stations 101 at a base station pooling location 106 for communications of cell signals of the cells. In an example implementation, the base station pooling location may comprise a number of cells provided by one baseband or a set of basebands, which may all be compactly located in the same base station rack or cabinet. In another example implementation, the base station pooling location may comprise a room, where the one or more base stations 101 are deployed and where a backhaul to a core network for the one or more base stations is provided.

The bridge links 105 between the donor bridge node 102 and the service bridge nodes 104 are provided on bridge link frequency bands which are different from the frequency bands used by the one or more base stations for the cells, Cell A, at the base station sites. The cell signals are communicated between the donor bridge node and service bridge nodes over the bridge links, whereby interference caused by front-hauling of the cells over the bridge links to the cells provided by the base stations at the base station sites may be mitigated. At the service bridge nodes, the cell signals are communicated on the same frequency bands with the cells, Cell A, provided at the base station sites, whereby the service bridge nodes serve for capacity enhancement of the base stations at the deployment locations of the service bridge nodes.

The bridge may be configured to support uplink (UL) and downlink (DL) communications of cell signals. In an example operation of the bridge for DL communications, the donor bridge node 102 is connected to the base station pooling location 106 whereby the donor bridge node may receive one or more cell signals, in this case one or more DL cell signals, from the one or more base stations 101. The donor bridge node may upconvert the received one or more cell signals to carrier frequencies, $[f_1, \ldots f_m, \ldots f_M]$, where m denotes the cell [1,M], in a frequency band of the bridge link, e.g., bridge link carrier frequencies in a bridge link frequency band, for transmitting the received one or more cell signals over the bridge link to the one or more service bridge nodes. The service bridge nodes may downconvert the cell signals from the frequency band of the bridge link, e.g., the bridge link frequency band, to a frequency band of a service link, e.g., a service link frequency band.

In an example operation of the bridge for UL communications, the service bridge node 104 may receive a cell signal, in this case an UL cell signal, from UE over the service link on the service link frequency band. The service bridge node may upconvert the received cell signal to carrier frequencies $[f_1, \ldots f_m, \ldots f_M]$, where m denotes the cell [1,M] in the frequency band of the bridge link 105, e.g., the bridge link carrier frequencies in the bridge link frequency band, for transmitting the received one or more cells signals over the bridge link to the donor bridge node. The donor bridge node downconverts the cell signal from the bridge link to a carrier frequency $[f_{c,1}, \ldots f_{c,n}, \ldots f_{c,N}]$ in the frequency band of the base station or to baseband frequency. At the donor bridge node, the downconverted UL cell signal is connected to the base station 101 at the base station pooling location 106.

In accordance with at least some embodiments, the cell signals may comprise digital or analog signals. Examples of the analog signals comprise radio frequency signals. A radio frequency cell signal may be provided at a carrier frequency of a cell at the base station pooling location 106. Examples of the digital signals comprise digital baseband signals such as Common Public Radio Interface (CPRI) signals. A baseband cell signal may be provided at the base station pooling location 106. A CPRI signal may be received at a base station pooling location 106 from a baseband part of the base station for example.

The digital baseband cell signals and radio frequency signals may comprise UL cell signals communicated by UE to a base station 101 and DL cell signals communicated by the base station 101 UE, when the UE is served by a cell. It should be noted that the cell signals may also comprise cell signals associated with a given cell but not dedicated to a specific UE served by the cell, such as broadcast information/signaling/data communicated by a cell. The radio frequency signals may comprise radio frequency signals in one or more frequency bands of the one or more base stations 101. The radio frequency signals may be at carrier frequencies $[f_{c,1}, \ldots f_{c,n}, \ldots f_{c,N}]$ in a frequency band used by the one or more base stations for providing cells at the base station sites. The radio frequency signals may be received at a base station pooling location 106 from RF front-ends of the base stations for example.

In accordance with at least some example embodiments, the cell signals at the base station pooling location 106 comprise radio frequency signals at the service link carrier frequencies [$f_{c,1}, \ldots f_{c,n}, \ldots f_{c,N}$] of each cell signal in the service link frequency band. The service link carrier frequencies may be carrier frequencies used by the one or more base stations for providing cells at the base station sites.

In accordance with at least some example embodiments, the cell signals at the base station pooling location 106 comprise digital baseband signals.

In accordance with at least some example embodiments, the bridge comprises a donor bridge node 102 and one or more service bridge nodes 104. The donor bridge node is configured to connect to a base station pooling location 106 comprising cell signals; determine for each of the cell signals a service link carrier frequency in a service link frequency band and a bridge link carrier frequency in a bridge link frequency band; associate each of the cell signals and the determined carrier frequencies in the service link frequency band and in the bridge link frequency band with the one or more service bridge nodes; and communicate each of the cell signals, with the one or more service bridge nodes associated with each cell signal, at the bridge link carrier frequency of the cell signal in the bridge link frequency band. The one or more service bridge nodes are configured to communicate with the donor bridge node at the carrier frequency of the bridge link frequency band and with user equipment (UE) in the service link carrier frequency band of the service link frequency band associated with one of the cell signals.

In accordance with at least some example embodiments, a bridge comprises a donor bridge node 102 and one or more service bridge nodes 104. The donor bridge node comprises a control connected to a donor bridge transceiver for controlling the donor bridge transceiver, and the transceiver of the donor bridge node is configured to connect to a base station pooling location 106 comprising cell signals. The control of the donor bridge node is configured to determine for each of the cell signals a service link carrier frequency $f_{c,1}, f_{c,n}, f_{c,N}$ in a service link frequency band and a bridge link carrier frequency $f_1, f_m, f_M$ in a bridge link frequency band. The control of the donor bridge node is configured to associate each of the cell signals and the determined carrier frequencies in the service link frequency band and the bridge link frequency band with the one or more service bridge nodes 104.

The control of the donor bridge node is configured to control the transceiver of the donor bridge node to communicate each of the cell signals, with the one or more service bridge nodes 104 associated with each cell signal, at the bridge link carrier frequency $f_1, f_m, f_M$ the cell signal in the bridge link frequency band. The one or more service bridge nodes 104 comprise controls connected to service bridge transceivers for controlling the service bridge transceivers, and the transceivers of the service bridge nodes are configured to communicate with the donor bridge node 102 at the bridge link carrier frequency $f_1, f_m, f_M$ of the bridge link frequency band and with user equipment at the service link carrier frequency $f_{c,1}, f_{c,n}, f_{c,N}$ of the service link frequency band associated with one of the cell signals.

The frequency band of the bridge links may comprise at least one of millimeter wave or mmWave radio frequencies and submillimeter wave radio frequencies. The mmWave frequencies in context of wireless communications systems comprise, at least radio frequencies from 24 GHz to 100 GHz. The submillimeter wave radio frequencies in context of wireless communications systems comprise at least 100 GHz to 10 THz. Cell signals at the base station sites and at the service bridge nodes, the service links, may comprise radio frequency signals at carrier frequencies in lower frequency bands than the frequency band used for the bridge links.

Examples of the lower frequency bands comprise sub-6 GHz frequency bands such as 3.3-3.8 GHz [n78], 3.8-4.2 GHz [n77], 4.4-5 GHz [n79], 2.6 GHz FDD [n7] and TDD [n38], 2.5 GHz TDD [n41,n90], 2.3 GHz FDD [n30] and TDD [n40], 2.1 GHz FDD [n1] and TDD [n65], 1.9 GHz FDD [n2,n25] and TDD [n39], 1.8 GHz FDD [n3], where 3GPP band is indicated in square brackets and FDD is for Frequency Division Duplex (FDD) and TDD is for Time Division Duplex (TDD). Using a similar notation as for the lower frequency bands, examples of the mmWave frequency bands comprise frequency bands for 5G: 24.25-27.5 GHz TDD [n258], 26.5-29.5 GHz TDD [n257], 27.5-28.35 GHz TDD [n261], 37-40 GHz TDD [n260].

It should be appreciated that preferably the frequency band of the bridge link is on a higher frequency band than the frequency band used for the cells, Cell A, provided at the base station sites and used for the front-hauled cells, Cell 1, Cell, n, Cell N, over the service link. In this way the bridge link may support frequency-division multiplexing of cell signals. In an example, a bridge link may have several 100 MHz, in mmWave spectrum, which allows for frequency-division multiplexing of many sub-6 GHz cell signals (service link signals) with bandwidths of 20-100 MHz on the bridge link.

In accordance with at least some example embodiments, the donor bridge nodes 102 and service bridge nodes 104 may have high gain beamforming antennas, which provide sufficient directionality for reusing mmWave carrier frequencies, depending on the angular spread of the antennas. Therefore, the frequency reuse provides that M≤N and allows spatial-division multiplexing of bridge links.

In accordance with at least some example embodiments, at least one cell, Cell A, provided directly by the base station and one or more of the front-hauled cells, Cell 1, Cell, n, Cell N, have the same carrier frequency. In an example, the cell provided directly by the base station has a coverage area at the base station site at a carrier frequency in a sub-6 GHz frequency band. The same carrier frequency may be used by a service bridge node for a front-hauled cell.

Figure 2:
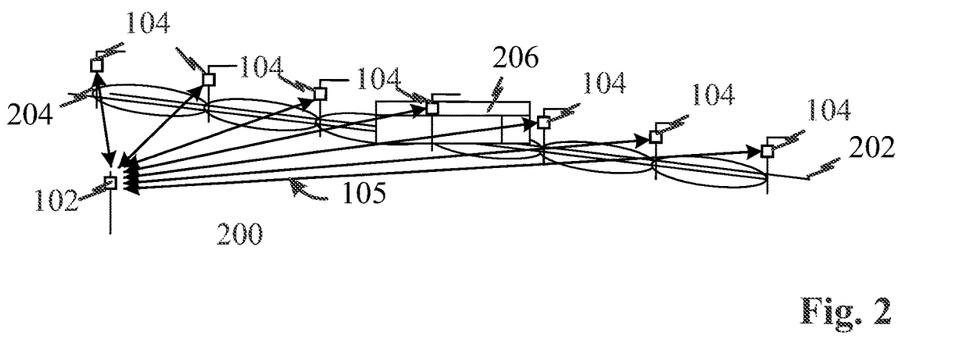
FIG. 2 illustrates an example application of a system for front-hauling the cells of the base stations along a railway track.

FIG. 2 illustrates an example application of a system for front-hauling the cells of the base stations along a railway track. Shown in FIG. 2 is system 200. In this regard, the system 200 is described with references to some of the elements of the system 100 of FIG. 1.

In the example implementation illustrated in FIG. 2, donor bridge nodes 102 are deployed at a distance from the railway track 202 and connected by bridge links 105 to service bridge nodes 104 installed on catenary masts 204, whereby the service bridge nodes 104 may provide a single linear cell along the railway track segment. The service bridge nodes 104 may comprise beamforming antennas with sufficient directionality for providing the linear cell. A linear cell may also be referred to as an RF corridor or a capacity corridor.

The linear cell may have a coverage area whose length is much greater than its width, whereby the coverage area is efficiently limited to serve UE located in a narrow area such as roads or railway tracks. The direction of length of the linear cells is preferably aligned with a length direction of the narrow area such that coverage may be provided to the UE moving along the narrow area e.g. a road or the railway tracks or other areas, where movement of the UE is significantly constrained in at least one direction of movement by limits of the areas. It should be appreciated that the service bridge nodes 104 may be also installed on train wagons for serving the users inside the wagons.

Figure 3:
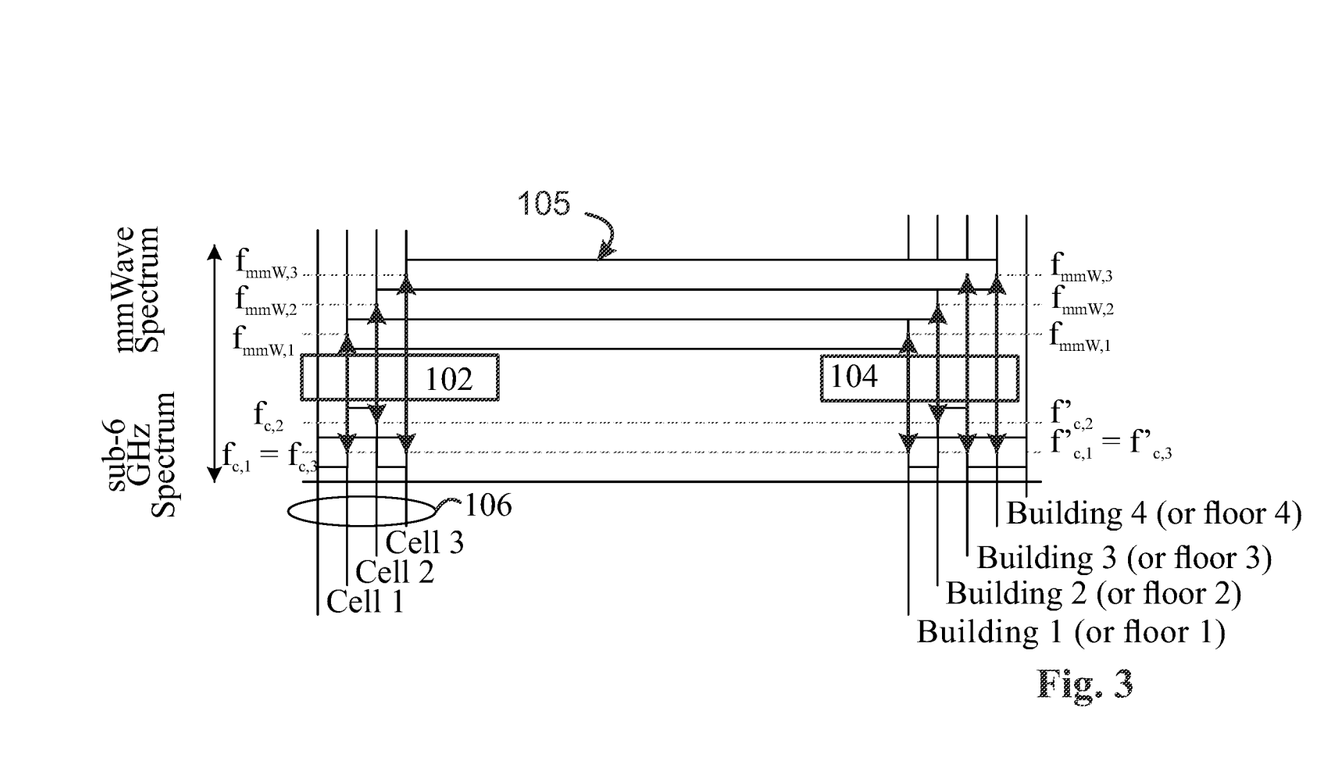
FIG. 3 illustrates examples of frequency configurations for a donor bridge node and a service bridge node in accordance with at least some embodiments of the present invention.

FIG. 3 illustrates examples of frequency configurations for a donor bridge node and a service bridge node in accordance with at least some embodiments of the present invention. Shown in FIG. 3 is an example frequency configuration. In this regard, the frequency configuration illustrated in FIG. 3 is described with respect to references corresponding to elements of the system 100 of FIG. 1.

The frequency configuration associates each cell signal, a bridge link carrier frequency of the cell signal in a bridge link frequency band, and a service link carrier frequency of the cell signal in a service link frequency band with the one or more service bridge nodes. In the following, at least some example embodiments are described using a sub-6 GHz frequency band for the service link frequency band and a mmWave frequency band for the bridge link frequency band.

The bridge may comprise a donor bridge 102 node and one or more service bridge nodes 104 described with reference to FIG. 1. The donor bridge is connected by bridge links 105 in the mmWave frequency band to the service bridge nodes that provide service links to UE. The frequency configuration defines a mapping between carrier frequencies, $f_{c,1}$, $f_{c,2}$, $f_{c,3}$, of cells at a base station pooling location 106 of the donor bridge node to carrier frequencies, $f_{mmW,1}$, $f_{mmW,2}$, $f_{mmW,3}$, on a bridge link between the donor bridge node and service bridge nodes, and a mapping between the carrier frequencies, $f_{mmW,1}$, $f_{mmW,2}$, $f_{mmW,3}$, on the bridge link to carrier frequencies, $f'_{c,1}$, $f'_{c,2}$, $f'_{c,3}$, of the service links at the service bridge nodes. In this way the donor bridge node and the service bridge nodes may be configured to convert the cell signals between different frequency bands.

At the donor bridge node 102, radio frequency signals of different cells, Cell 1, Cell 2, Cell 3, may be obtained from a base station in the sub-6 GHz frequency band and converted to the mmWave frequency band of the bridge links. According to an example, Cell 1 is at carrier frequency $f_{c,1}$, Cell 2 is at carrier frequency $f_{c,2}$ and Cell 3 is at carrier frequency $f_{c,3}$, such that $f_{c,1} = f_{c,3}$. Accordingly, it should be appreciated that some of the cells may use the same carrier frequency or different carrier frequencies in the sub-6 GHz frequency band. The donor bridge 104 is configured to convert radio signals of the cells to different carrier frequencies in the mmWave frequency band.

According to an example implementation, Cell 1 is converted by the donor bridge to carrier frequency $f_{mmW,1}$, Cell 2 is converted by the donor bridge to carrier frequency $f_{mmW,2}$, and Cell 3 is converted by the donor bridge to carrier frequency $f_{mmW,3}$. The service bridge node 104 is configured to convert radio frequency signals of the cells in the mmWave frequency band back to the sub-6 GHz frequency band.

According to an example implementation, the radio frequency signal of Cell 1 is converted by the service bridge node at Building 1 (or floor 1) to carrier frequency $f'_{c,1}$, the radio frequency signal of Cell 2 is converted by the service bridge node at Building 2 (or floor 2) to carrier frequency $f'_{c,2}$ and the radio frequency signal of Cell 3 is converted by the service bridge node at Building 3 (or floor 3) to carrier frequency $f'_{c,3}$, such that $f'_{c,1} = f'_{c,3}$. In this way, Cell 1, Cell 2 and Cell 3 may be front-hauled to the service bridge nodes.

In accordance with at least some example embodiments, the bridge comprises at least two service bridge nodes 104 configured to receive a radio frequency signal of the same cell on a carrier frequency of the mmWave frequency band. In this way the same cell may be front-hauled to more than one, for example two, three, four or a plurality of service bridge nodes.

In accordance with at least some example embodiments, service bridge nodes deployed at Building 3 (floor 3) and Building 4 (or floor 4) may be configured to convert the radio frequency signal of Cell 3 in the mmWave frequency band and convert the radio frequency signal of Cell 3 to the same carrier frequency $f'_{c,1}$, such that $f'_{c,1} = f'_{c,3}$, at the service bridge nodes.

Figure 4:
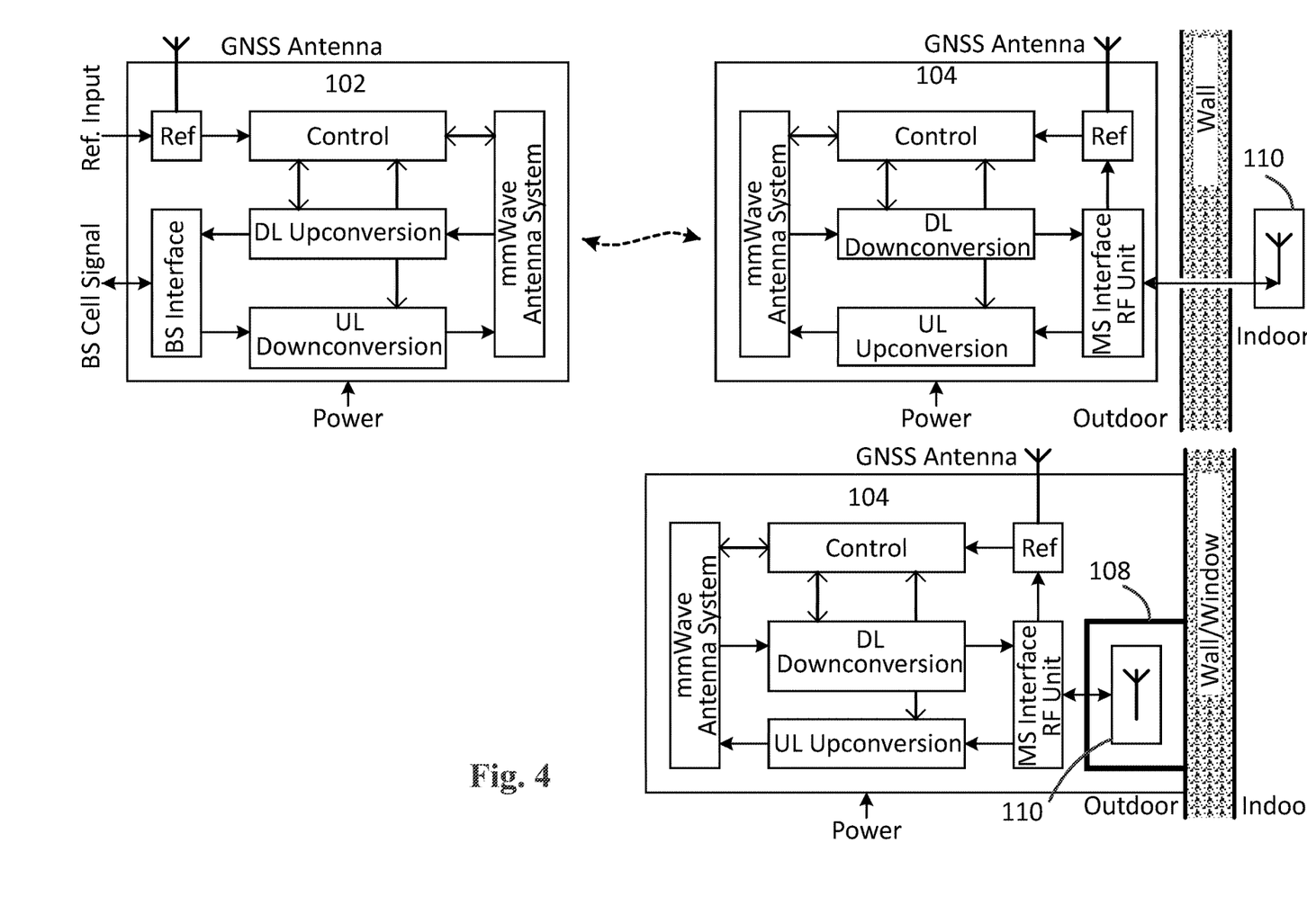
FIG. 4 illustrates examples of blocks for a donor bridge node and service bridge nodes in accordance with at least some embodiments of the present invention.

FIG. 4 illustrates examples of blocks for a donor bridge node and service bridge nodes in accordance with at least some embodiments of the present invention. Shown in FIG. 4 are example implementations of donor bridge node and service bridge nodes that may be used to implement a bridge in accordance with an embodiment.

In this regard, the blocks of the donor bridge node and the service bridge node as illustrated in FIG. 4 are described with references to the system 100 as described with respect to FIG. 1. As illustrated in FIG. 4, the donor bridge node 102 comprises the following blocks: "Base Station (BS) interface," "DL Upconversion," "UL Downconversion," "mmWave Antenna System," "Control," and "Ref." In this regard, each of these components may comprise suitable circuitry for implementing all functions and/or operations attributed thereto in accordance with various aspects of the present disclosure.

As utilized in the example embodiment of the donor bridge node 102, the Base Station (BS) interface may be configured to connect to one or more base stations 101 for communications of cell signals with base stations. In an example, the BS interface is configured to connect to a base station pooling location 106 comprising cell signals. The BS interface may comprise an analog RF signal interface configured to separate downlink and uplink signals. Separation of the downlink and uplink signals may be performed by a duplexer or a circulator. On the other hand, the BS interface may comprise a digital-analog signal interface converting a digital baseband signal to an analog signal for upconversion and digitizing a downconverted analog signal to a digital signal for the base station. Examples of the digital baseband signal comprise at least e.g., a Common Public Radio Interface (CPRI) signal or a similar signal. The BS interface may be configured to perform additional signal processing for example optimizing the signal for transmission over mmWave frequencies, adding control signals and/or adding reference signals. The BS interface may also comprise additional components.

As utilized in the example embodiment of the donor bridge node 102, the DL Upconversion may be an analog converter or a part of an analog converter configured to convert a radio frequency signal at sub-6 GHz frequencies up to mmWave frequencies.

As utilized in the example embodiment of the donor bridge node 102, the UL Downconversion may be an analog converter or a part of an analog converter configured to convert a radio frequency signal at mmWave frequencies down to sub-6 GHz frequencies.

As utilized in the example embodiment of the donor bridge node 102, the mmWave Antenna System may be a circuit for connecting both downlink and uplink signals to a single mmWave antenna, or the mmWave Antenna System may comprise separate antennas for downlink and uplink.

The antenna system may have a static beam, or the antenna system may support dynamic beamforming.

As utilized in the example embodiment of the donor bridge node 102, the Control may be a control system connected to one or more of the other blocks that may be referred to a transceiver. The Control may be configured to control the one or more other blocks. For example, the Control may be configured to control the frequency of a local oscillator for up-conversion and down-conversion between different frequency bands, e.g., a sub-6 GHz frequency band and a mmWave frequency band. Alternatively, or additionally, the control system may be configured to control antenna beamforming, when the donor bridge node or service bridge node comprises dynamic beamforming antennas.

In an example implementation, the Control is configured to cause the donor bridge node 102 to determine for each of the cell signals a service link carrier frequency, $f_{c,1}$, $f_{c,n}$, $f_{c,N}$, in a service link frequency band and a bridge link carrier frequency, $f_1$, $f_m$, $f_M$, in a bridge link frequency band; associate each of the cell signals and the determined carrier frequencies in the service link frequency band and the bridge link frequency band with the one or more service bridge nodes 104; control the transceiver of the donor bridge node to communicate each of the cell signals, with the one or more service bridge nodes 104 associated with each cell signal, at the bridge link carrier frequency, $f_1$, $f_m$, $f_M$, of the cell signal in the bridge link frequency band.

In an example implementation, the Control is configured to cause a service bridge node to communicate with the donor bridge node 102 at the bridge link carrier frequency, $f_1$, $f_m$, $f_M$, of the bridge frequency band and with user equipment at the service link carrier frequency, $f_{c,1}$, $f_{c,n}$, $f_{c,N}$, of the service link frequency band associated with one of the cell signals.

As utilized in the example embodiment of the donor bridge node 102, the Ref. may be a reference oscillator circuit configured to provide a stable oscillator reference signal, preferably with low phase noise. The oscillator reference signal may be provided on the basis of a reference signal. Examples of reference signals comprise an external calibrated reference signal, an externally provided reference signal, determined based on a frequency offset estimation of the DL cell signal or a signal from a Global Navigation Satellite Service (GNSS) such as Global Positioning System (GPS). An external calibrated reference signal may be directly received from base station equipment or derived from base station equipment.

In accordance with at least some example embodiments, the donor bridge node 102 comprises an analog converter for converting the cell signals between the service link carrier frequency in the service link frequency band and the bridge link carrier frequency in the bridge link frequency band, and the analog converter comprises a reference oscillator circuit, the Ref., configured to determine an oscillator reference signal on the basis of at least one of: an external calibrated reference signal, frequency offset estimation of downlink cell signals and a signal from a Global Navigation Satellite Service (GNSS), such as Global Positioning System (GPS); and the Control of the donor bridge node 102 is connected to the reference oscillator circuit and configured to receive the oscillator reference signal determined by the reference oscillator circuit and to control the analog converter on the basis of the determined oscillator reference signal.

In accordance with at least some example embodiments, the Control of the donor bridge node 102 is configured to control the transceiver of the donor bridge node to insert the determined oscillator reference signal in-band or out-of-band to one or more downlink cell signals communicated to the one or more service bridge nodes 104. In this way conversion of cell signals between carrier frequencies of the bridge link and the service link may be performed at the service bridge nodes based on the oscillator reference signal determined by the donor bridge node.

As illustrated in FIG. 4, the service bridge node 104 comprises blocks at least partly the same as or similar to the blocks of the donor bridge node 102 ("DL Upconversion," "UL Downconversion," "mmWave Antenna System," "Control," and "Ref."), but with some differences. The service bridge node 104 omits the "Base Station (BS) interface" block, however, but comprises a different block: "Mobile Station (MS) Interface RF Unit." In this regard, each of these components may comprise suitable circuitry for implementing all functions and/or operations attributed thereto in accordance with various aspects of the present disclosure.

The DL Downconversion may be an analog or a part of an analog converter configured to convert a radio frequency signal on mmWave frequencies down to sub-6 GHz frequencies.

The UL Upconversion may be an analog converter or a part of an analog converter configured to convert a radio frequency signal on sub-6 GHz frequencies up to mmWave frequencies.

The MS interface RF unit may be configured to combine/separate downlink and uplink signals and connect to an RF signal cable for the sub-6 GHz service antenna for communications with UE on the service link. Additionally, the downlink signal may be processed to provide a control signal for the Ref. block at the service bridge node 104. The control signal may be a reference signal determined or derived on the basis of a downlink cell signal, where an oscillator reference signal has been inserted by the donor bridge node in-band or out-of-band.

The Ref. block is a reference oscillator circuit configured to provide a stable oscillator reference signal, preferably with low phase noise. The stable oscillator reference signal may be provided on the basis of a reference signal. Examples of reference signals comprise an external calibrated reference signal, a reference signal derived from downlink signal, a reference signal determined based on frequency offset estimation of DL cell signal, a reference signal determined based on an additional signal that has been inserted as in-band/out-of-band to a DL cell signal received from a donor bridge node 102 or a signal from a GNSS, such as GPS.

The reference signal derived from the downlink signal may comprise an oscillator reference signal inserted by the donor bridge node in-band or out-of-band to one or more downlink cell signals. The oscillator reference signal inserted by the donor bridge node to the downlink cell signal controls a difference between local oscillator frequencies of the donor bridge node and the service bridge node for minimizing a difference between a carrier frequency of the cell signal at the base station pooling location 106 and the service link carrier frequency of the cell signal.

The Control may be a control system connected to one or more of the other blocks of the service bridge node that may be referred to a transceiver. The Control may be configured to control the one or more other blocks. In an example implementation, the Control is configured to cause the service bridge node to communicate with the donor bridge node 102 at the bridge link carrier frequency, $f_1$, $f_m$, $f_M$, of the bridge frequency band and with user equipment at the service link carrier frequency, $f_{c,1}$, $f_{c,n}$, $f_{c,N}$, of the service link frequency band associated with one of the cell signals.

The Indoor Serving Antenna 110 may comprise a single antenna, an antenna array or a distributed antenna system, providing a sub-6 GHz cellular network signal for a service link. The service link may be provided inside a confined space, such as a building or a tunnel, or the service link may be provided along a train track. In an example deployment of the service bridge node 104, the indoor serving antenna may be installed indoors and connected by an RF cable, e.g., through a wall, window or other structure, to the MS Interface RF unit that is located outdoors. In this way the service bridge node may be deployed outdoors, e.g., to a wall, but the indoor serving antenna may be deployed indoors. In another example deployment of the service bridge node, the service bridge node comprises a shielded space 108 for the indoor serving antenna.

The shielded space may be configured to provide shielding against radiation of the indoor serving antenna towards the surroundings of a confined space at a site of the service bridge node, when the indoor serving antenna is within the shielded space. At the site, the service bridge node may be installed on a wall or other structure on the outside of the confined space and the indoor serving antenna is within the shielded space and directed towards the inside of the confined space, e.g., towards a wall, a window or other structure of the confined space, such that communications with UE inside the confined space may be performed provided the signal radiated by the indoor serving antenna easily penetrates the a wall, a window or other structure.

It should be appreciated that the service bridge node may be deployed indoors, whereby penetration of a wall or window by an RF cable or by a signal of the indoor serving antenna is not needed and omitting the shielded space may also be considered. However, in such a deployment scenario, the service bridge node may comprise an antenna adapted for communications with the donor bridge node 102 over a bridge link through a wall, a window or other structure of a confined space inside of which the service bridge node is deployed. Such antenna may be a beamforming antenna that may be optimized for communications through a wall, a window or other structure of a confined space inside of which the service bridge node is deployed, an on-glass antenna installed on a window or a wall or other structure.

In accordance with at least some example embodiments, a service bridge node 104 comprises: an analog converter for converting one or more cell signals between a bridge link carrier frequency in a bridge link frequency band and a service link carrier frequency at a service link frequency band, and a reference oscillator circuit configured to determine an oscillator reference signal on the basis of at least one of: an external calibrated reference signal, a reference signal derived from a downlink cell signal, a reference signal determined based on frequency offset estimation of received downlink cell signals or a signal from a GNSS such as GPS; and the service bridge node is configured to control the analog converter on the basis of the determined oscillator reference signal.

It should be appreciated that blocks for the service bridge node 104 and donor bridge node 102 have been described in FIG. 4 for communications of Frequency Division Duplexing (FDD) signals, which comprise most cellular signals in the frequency bands below 3 GHz, the DL and UL paths need to be separated and combined for the respective frequency conversion. Examples of implementations for separating and combining the UL and DL paths may be implemented with a duplexer, or alternatively with a circulator, in the BS Interface, mmWave Antenna System of the donor bridge node, mmWave Antenna System of the service bridge node, and MS Interface. However, such a separation is not necessary if separate DL and UL signal path at the base station or the mmWave Antenna System exist.

It should be appreciated that, although the blocks in FIG. 4 have been described for FDD communications between the service bridge node 104 and donor bridge node 102, the service bridge node and donor bridge node may be implemented also using Time Division Duplexing (TDD) between the service bridge node and donor bridge node. The TDD implementation of the service bridge node may have additional components in BS Interface, mmWave Antenna System of the donor bridge node, mmWave Antenna System of the service bridge node, and MS Interface, for preventing feedback loops. The additional components may comprise circulators, solid-state RF signal switches, or ideally Full-Duplex Suppression or Cancellation techniques.

In accordance with at least some example embodiments, at least one of a donor bridge node 102 and a service bridge node 104 comprises one or more beamforming antennas. A beamforming antenna may comprise a static beam or a dynamically changing and configurable beam. The donor bridge node and the service bridge node may be configured to perform beam steering of the one or more beamforming antennas for beam alignment of the beamforming antennas.

In an example implementation of the beam steering, the donor node may be configured to transmit a specific signal, e.g., a signal modulated with a specific reference signal, in specific directions/angles, while a beamforming antenna at a service bridge node may be configured for receiving with a relatively wide angle, e.g., omnidirectionally. Transmission of the specific signal may also be referred to as sweeping. The specific signal may be injected by the donor bridge node to a radio frequency signal transmitted to the service bridge node on a bridge link. The best direction/angle of the donor bridge node is determined at the service bridge node on the basis of receiving signals transmitted by the donor bridge node during sweeping.

Once the best donor node beam angle is found, the service bridge node is scanning the best beam angle for its own antenna. This beam alignment process could also be initiated by the serving node or being done on the donor as well as serving node simultaneously. It should be appreciated that instead of using the specific signal known to service bridge node and donor bridge node, the cellular signal conveyed by the bridge is used to estimate and align antenna beams of the donor bridge node and the service bridge node.

Figure 5:
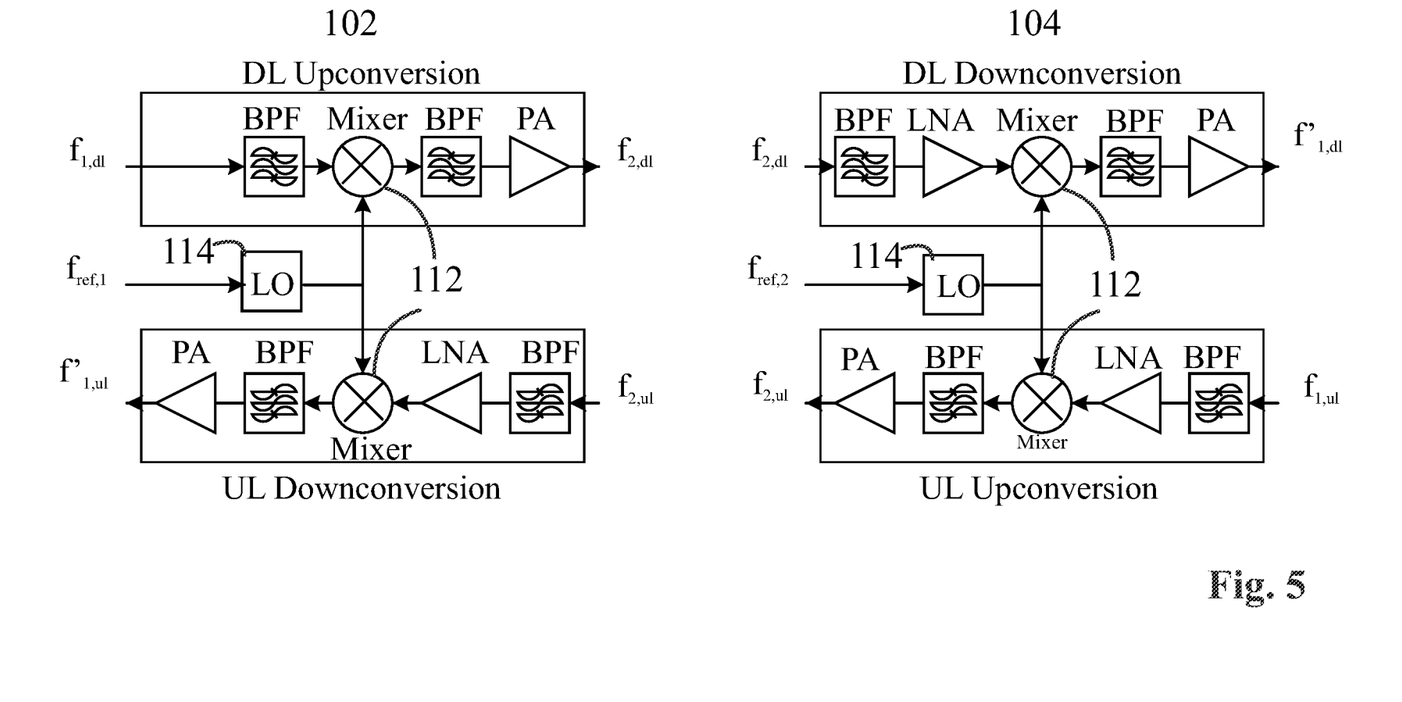
FIG. 5 illustrates examples of up-conversion and down-conversion blocks for a donor bridge node and a service bridge node in accordance with at least some embodiments of the present invention.

FIG. 5 illustrates examples of up-conversion and down-conversion blocks for a donor bridge node and a service bridge node in accordance with at least some embodiments of the present invention. Shown in FIG. 5 are example implementations of up-conversion and the down-conversion blocks for a donor bridge node and a service bridge node, such as the DL Upconversion and UL Downconversion blocks of the donor bridge node 102 and the service bridge node(s) 104 as illustrated in and described with reference to FIG. 1 and FIG. 4.

It should be appreciated, however, that some of the illustrated blocks, e.g. filters and amplifiers may be different, could be placed at another position, or even omitted. While the amplifiers and filters depicted in FIG. 5 are static, the design is not restricted to that, and the amplifiers could have an adjustable gain, and the filters could also be adjustable.

The donor bridge node 102 may comprise DL Upconversion and UL Downconversion blocks. The DL Upconversion block may obtain a radio frequency signal at a carrier frequency $f_{1,dl}$ from a BS interface and output a radio frequency signal at a carrier frequency $f_{2,dl}$. The UL downconversion block may obtain a radio frequency signal at a carrier frequency $f_{2,ul}$ from a bridge link and output a radio frequency signal on a carrier frequency $f'_{1,ul}$ on the frequency band used by the base station or a baseband signal may be output.

The service bridge node 104 may comprise DL downconversion and UL upconversion blocks. The DL downconversion block may obtain a radio frequency signal at a carrier frequency $f_{2,dl}$ from the bridge link and output a radio frequency signal at a carrier frequency $f'_{1,dl}$. The UL upconversion block may obtain a radio frequency signal at a carrier frequency $f_{1,ul}$ from a service link and output a radio frequency signal at a carrier frequency $f_{2,ul}$ on the bridge link.

The DL Upconversion and UL Downconversion of the donor bridge node 102 and the DL downconversion and UL upconversion of the service bridge node 104 may provide analog converters for analog UL and DL signal paths for converting cell signals between one or more carrier frequencies of a service link frequency band and one or more carrier frequencies of a bridge link frequency band, e.g. between a carrier frequency in a sub-6 GHz frequency band and a mmWave frequency band. In the illustrated example, the donor bridge node and service bridge node comprise mixers 112 that are operated by local oscillators (LO) 114 at frequencies $f_{ref,1}$ and $f_{ref,2}$ for up-converting and down-converting the radio signals, band-pass filters (BPF), power amplifiers (PA), and low-noise amplifiers (LNA). The frequencies $f_{ref,1}$ and $f_{ref,2}$ of the Los are preferably the same or at least an error between the $f_{ref,1}$ and $f_{ref,2}$ is minimized. In this way the conversion of cell signals between the bridge link and the service link and the cell signals at the base station pooling location 106 may be performed accurately to configured carrier frequencies in the bridge link frequency band and the service link frequency band.

Referring to FIG. 1, FIG. 4, and FIG. 5, in accordance with at least some example embodiments, a bridge comprises a donor bridge node 102 comprising: an analog converter for converting the cell signals between the service link carrier frequency in the service link frequency band and the bridge link carrier frequency in the bridge link frequency band, and the analog converter comprises a reference oscillator circuit, Ref., configured to determine an oscillator reference signal on the basis of at least one of: an external calibrated reference signal, frequency offset estimation of downlink cell signals and a signal from a Global Navigation Satellite Service (GNSS), such as Global Positioning System (GPS); and the Control of the donor bridge node 102 is connected to the reference oscillator circuit and configured to receive the oscillator reference signal determined by the reference oscillator circuit and to control the analog converter on the basis of the determined oscillator reference signal.

In accordance with at least some example embodiments, the Control of the donor bridge node 102 is configured to control the transceiver of the donor bridge node to insert the determined oscillator reference signal in-band or out-of-band to one or more downlink cell signals communicated to the one or more service bridge nodes 104.

Referring to FIG. 1, FIG. 4, and FIG. 5, in accordance with at least some example embodiments, a bridge comprises one or more service bridge nodes 104 that each comprise: an analog converter for converting the cell signals between the service link frequency band and the bridge link frequency band and a reference oscillator circuit, Ref., configured to determine an oscillator reference signal on the basis of at least one of: an external calibrated reference signal, a reference signal derived from a downlink cell signal, a reference signal determined based on a frequency offset estimation of a downlink cell signal and a signal from a Global Navigation Satellite Service (GNSS), such as Global Positioning System (GPS); and wherein the Control of each of the service bridge nodes, 104, is connected to the reference oscillator circuit of the service bridge node and configured to receive the oscillator reference signal determined by the reference oscillator circuit and to control the analog converter on the basis of the determined oscillator reference signal.

Referring to FIG. 1, FIG. 4, and FIG. 5, in accordance with at least some example embodiments, the reference signal derived by the reference oscillator circuit, Ref., of each of the service bridge nodes 104 from the downlink cell signal comprises an oscillator reference signal inserted by the donor bridge node 102 in-band or out-of-band to one or more downlink cell signals.

Referring to FIG. 1, FIG. 4, and FIG. 5, in accordance with at least some example embodiments, the oscillator reference signal inserted by the donor bridge node, 102, to the downlink cell signal controls a difference between local oscillator frequencies, $f_{ref,1}$, $f_{ref,2}$, of the donor bridge node and the service bridge node for minimizing a difference between a carrier frequency, $f_{1,dl}$, of the cell signal at the base station pooling location, 106, and the service link carrier frequency, $f'_{1,dl}$, of the cell signal. It should be noted that the difference between the local oscillator frequencies may be controlled continuously during operation of the bridge and for each pair of service bridge node connected to the donor bridge node.

Figure 6:
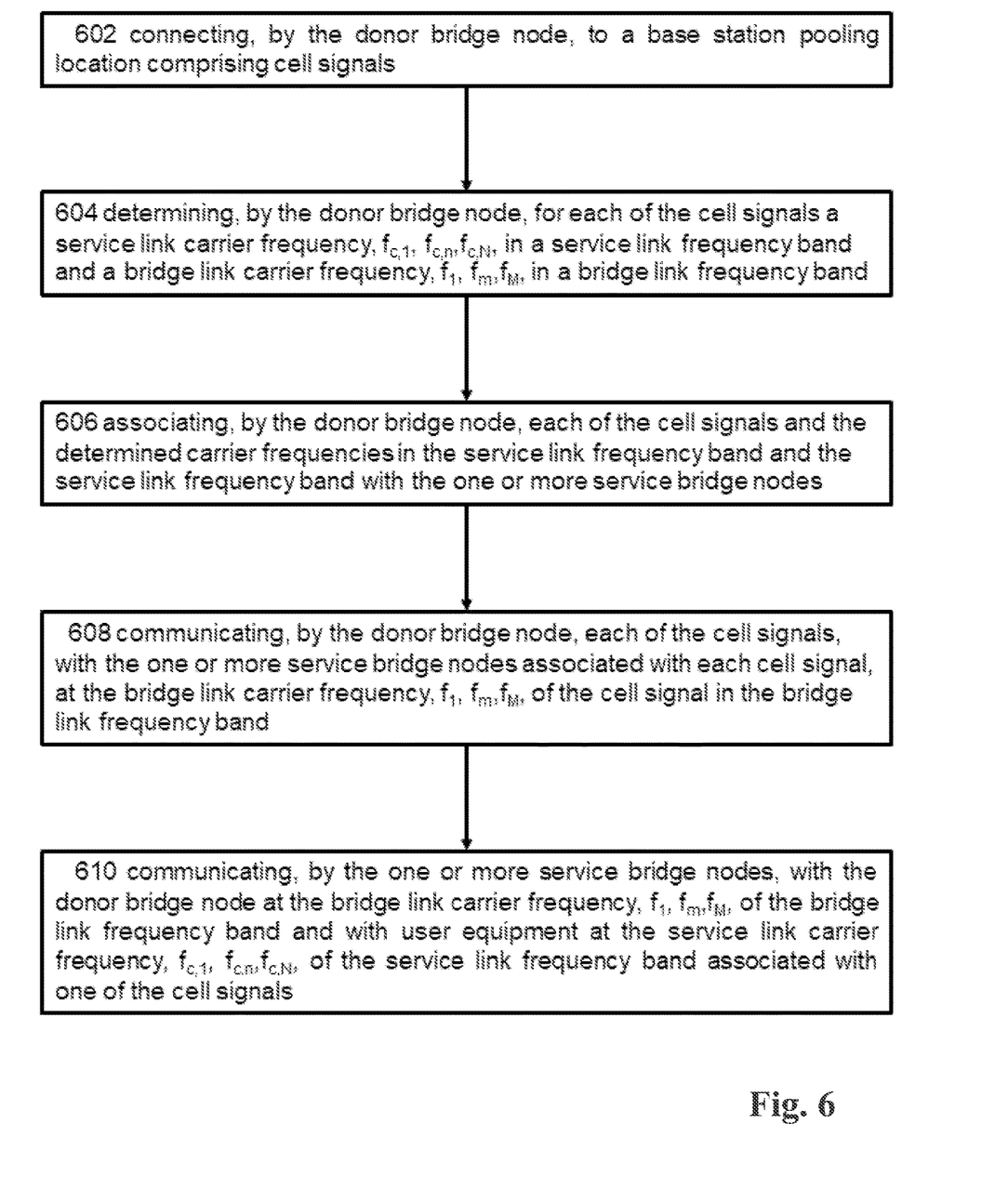
FIG. 6 illustrates an example of a method in accordance with at least some example embodiments. The method may be performed by a bridge comprising a donor bridge node and one or more service bridge nodes.

FIG. 6 illustrates an example of a method in accordance with at least some example embodiments. The method may be performed by a bridge comprising a donor bridge node and one or more service bridge nodes. Shown in FIG. 6 is a flow chart corresponding to the method, comprising a plurality of steps.

Step 602 comprises connecting, by the donor bridge node, to a base station pooling location 106 comprising cell signals.

Step 604 comprises determining, by the donor bridge node, for each of the cell signals a service link carrier frequency, $f_{c,1}$, $f_{c,n}$, $f_{c,N}$, in a service link frequency band and a bridge link carrier frequency, $f_1$, $f_m$, $f_M$, in a bridge link frequency band.

Step 606 comprises associating, by the donor bridge node, each of the cell signals and the determined carrier frequencies in the service link frequency band and the service link frequency band with the one or more service bridge nodes 104.

Step 608 comprises communicating, by the donor bridge node, each of the cell signals, with the one or more service bridge nodes 104 associated with each cell signal, at the bridge link carrier frequency, $f_1$, $f_m$, $f_M$, of the cell signal in the bridge link frequency band.

Step 610 comprises communicating, by the one or more service bridge nodes 104, with the donor bridge node 102 at the bridge link carrier frequency, $f_1$, $f_m$, $f_M$, of the bridge link frequency band and with user equipment at the service link carrier frequency, $f_{c,1}$, $f_{c,n}$, $f_{c,N}$, of the service link frequency band associated with one of the cell signals.

Referring to FIG. 1, FIG. 4, and FIG. 6, in accordance with at least some example embodiments, the Step 608 comprises converting, by an analog converter of the donor bridge node 102, the cell signals between the service link carrier frequency in the service link frequency band and the bridge link carrier frequency in the bridge link frequency band, and the analog converter comprises a reference oscillator circuit, Ref., configured to determine an oscillator reference signal on the basis of at least one of: an external calibrated reference signal, frequency offset estimation of downlink cell signals and a signal from a Global Navigation Satellite Service (GNSS), such as Global Positioning System (GPS); receiving, by the Control of the donor bridge node 102 connected to the reference oscillator circuit, the oscillator reference signal determined by the reference oscillator circuit; and controlling, by the Control of the donor bridge node 102, the analog converter of the donor bridge node on the basis of the determined oscillator reference signal.

Referring to FIG. 1, FIG. 4, and FIG. 6, in accordance with at least some example embodiments, the Step 610 comprises: converting, by an analog converter of each of the service bridge nodes 104, the cell signals between the service link frequency band and the bridge link frequency band; determining, by a reference oscillator circuit, Ref., of the analog converter of each of the service bridge nodes 104, an oscillator reference signal on the basis of at least one of: an external calibrated reference signal, a reference signal derived from a downlink cell signal, a reference signal determined based on a frequency offset estimation of a downlink cell signal and a signal from a Global Navigation Satellite Service (GNSS), such as Global Positioning System (GPS); and receiving, by the Control of each of the service bridge nodes 104 connected to the reference oscillator circuit, the oscillator reference signal determined by the reference oscillator circuit; and controlling, by the Control of each of the service bridge nodes 104, the analog converter of the service bridge node, on the basis of the determined oscillator reference signal.

Referring to FIG. 1, FIG. 4, and FIG. 6, in accordance with at least some example embodiments, the Step 608 comprises: controlling, by the Control of the donor bridge node 102, the transceiver of the donor bridge node to insert the determined oscillator reference signal in-band or out-of-band to one or more downlink cell signals communicated to the one or more service bridge nodes 104 for minimizing a difference between a carrier frequency, $f_{1,dl}$, of the cell signal at the base station pooling location 106 and the service link carrier frequency, $f'_{1,dl}$, of the cell signal.

It should be appreciated that although various examples are described with reference to specific frequency bands, also other frequency bands are viable at least within the examples of the bridge link frequency bands and the service link frequency bands given with the description of FIG. 1.

Examples of a control or a control system described herein comprise at least a processing device comprising one or more processors and a memory. The memory stores instructions for example a computer program or computer readable code. The one or more processors may be connected to the memory for executing the instructions. Execution of the instructions by the one or more processors causes carrying out one or more functionalities and/or a method described in an example in accordance with at least some embodiments of the present invention.

In some implementations, other optional features may be used or incorporated. These features may be combined with any of the above aspects of the present invention. One or more of the service bridge nodes 104 may be operatively connected to one or more sensors, and the service bridge nodes 104 may be configured to switch on in response to a triggering signal from at least one sensor of the one or more sensors anticipating or detecting arrival of a vehicle to a coverage area of the respective service bridge node 104.

The service bridge nodes 104 may be configured to be switched off after a given time period has elapsed after being switched on, on the basis of missing uplink signals at the service link carrier frequency $f_{c,1}$, $f_{c,n}$, $f_{c,N}$, in response to a further triggering signal from at least one sensor of the one or more sensors, and/or in response to a de-triggering signal from at least one sensor of the one or more sensors.

One or more of the service bridge nodes 104 may comprise an electric battery for powering communications on the bridge link carrier frequency $f_1$, $f_m$, $f_M$ of the bridge frequency band and on the service link carrier frequency $f_{c,1}$, $f_{c,n}$, $f_{c,N}$ of the service link frequency band. The respective service bridge nodes 104 may comprise one or more solar cells or solar panels for charging the electric battery. Alternatively, or in addition, other energy sources, e.g. renewable energy sources, providing autonomy can be used, such as a wind energy source, a hydropower energy source, or a kinetic energy source.

One or more of the service bridge nodes 104 may be configured to determine, at least after being switched on by the triggering signal and before being switched off, a battery charge level of its electric battery, and if the battery charge level is below a first threshold value, the respective service bridge node is configured to stay switched off until its electric battery has at least partially recharged or until its battery charge level has reached a second threshold value, which may or may not be the same as the first threshold value.

One or more of the service bridge nodes 104 may comprise a list of one or more neighboring service bridge nodes having at least partially overlapping coverage areas (between themselves and/or with the coverage area of the service node comprising the list), and the service bridge nodes 104 may be configured to notify their neighboring service bridge nodes that the notifying service bridge node will stay switched off until its electric battery has at least partially recharged and/or until a given switch-off period has elapsed.

In response to receiving a notification that a neighboring service bridge node is staying switched off, the notified service bridge node is configured to switch on and optionally to switch off in place of the notifying neighboring service bridge node.

It should be appreciated from the discussion above that the embodiments shown in the figures are merely exemplary, and include features that may be generalized, removed or replaced as described herein and as set out in the claims. With reference to the drawings in general, it will be appreciated that schematic functional blocks are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments, the function of one or more elements shown in the drawings may be integrated into a single functional unit.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present disclosure not be limited to the particular embodiment disclosed, but that the present disclosure will include all embodiments falling within the scope of the appended claims.

What is claimed is:

1. A bridge comprising:
   a donor bridge node and one or more service bridge nodes, wherein the donor bridge node comprises a control circuit connected to a donor bridge transceiver for controlling the donor bridge transceiver, wherein:
   the transceiver of the donor bridge node is configured to connect to a base station pooling location comprising a plurality of cell signals;
   the control circuit of the donor bridge node is configured to:
      determine for each of the plurality of cell signals a service link carrier frequency in a service link frequency band and a bridge link carrier frequency in a bridge link frequency band;
      associate each of the plurality of cell signals and the determined carrier frequencies in the service link frequency band and the bridge link frequency band with the one or more service bridge nodes; and
      control the transceiver of the donor bridge node to communicate each of the plurality of cell signals, with the one or more service bridge nodes associated with each cell signal, at the bridge link carrier frequency of the cell signal in the bridge link frequency band;
   wherein the one or more service bridge nodes comprise control circuits connected to service bridge transceivers for controlling the service bridge transceivers, and
   wherein the transceivers of the service bridge nodes are configured to communicate with the donor bridge node at the bridge link carrier frequency of the bridge frequency band and with user equipment at the service link carrier frequency of the service link frequency band associated with one of the plurality of cell signals.

2. The bridge according to claim 1, wherein the plurality of cell signals at the base station pooling location comprises radio frequency signals at the service link carrier frequencies of each cell in the service link frequency band.

3. The bridge according to claim 1, wherein the plurality of cell signals at the base station pooling location comprises digital baseband signals.

4. The bridge according to claim 1, wherein the donor bridge node comprises:
   an analog converter for converting the plurality of cell signals between the service link carrier frequency in the service link frequency band and the bridge link carrier frequency in the bridge link frequency band, wherein the analog converter comprises a reference oscillator circuit configured to determine an oscillator reference signal on the basis of at least one of:
      an external calibrated reference signal,
      frequency offset estimation of downlink plurality of cell signals, and
      a signal from a Global Navigation Satellite Service (GNSS); and
   wherein the control circuit of the donor bridge node is connected to the reference oscillator circuit and configured to receive the oscillator reference signal determined by the reference oscillator circuit and to control the analog converter on the basis of the determined oscillator reference signal.

5. The bridge according to claim 1, wherein the donor bridge node and/or one or more of the service bridge nodes comprise one or more beamforming antennas.

6. The bridge according to claim 1, wherein one or more of the service bridge nodes comprise a shielded space for housing an indoor serving antenna and the shielded space is configured to provide shielding against radiation of the indoor serving antenna towards surroundings of a confined space at a site of the service bridge node, when the indoor serving antenna is within the shielded space.

7. The bridge according to claim 1, wherein the service link frequency band comprises radio frequencies below 6 GHz.

8. The bridge according to claim 1, wherein the bridge link frequency band comprises at least one of millimeter wave radio frequencies and submillimeter wave radio frequencies.

9. The bridge according to claim 1, wherein each of the service bridge nodes is operatively connected to one or more sensors, and each of the service bridge nodes is configured to switch on in response to a triggering signal from at least one sensor anticipating an arrival of a vehicle to a coverage area of the service bridge node.

10. The bridge according to claim 9, wherein each of the service bridge nodes is configured to be switched off after a time period has elapsed after being switched on, on the basis of missing uplink signals at the service link carrier frequency, in response to a further triggering signal from at least one sensor and/or in response to a de-triggering signal from at least one sensor.

11. The bridge according to claim 9, wherein each of the service bridge nodes comprises an electric battery for powering communications on the bridge link carrier frequency of the bridge frequency band and on the service link carrier frequency of the service link frequency band.

12. The bridge according to claim 11, wherein each of the service bridge nodes comprises one or more solar cells, a wind energy source, a hydropower energy source, and/or a kinetic energy source for charging the electric battery.

13. The bridge according to claim 11, wherein each of the service bridge nodes is configured to determine, at least after being switched on by the triggering signal and before being switched off, a battery level of the electric battery, and if the battery level is below a given threshold, the respective service bridge node is configured to stay switched off until the electric battery has at least partially recharged.

14. The bridge according to claim 13, wherein each of the service bridge nodes comprises a list of one or more neighboring service bridge nodes having at least partially overlapping coverage areas, and each of the service bridge nodes is configured to notify their neighboring service bridge nodes of staying switched off until the electric battery has at least partially recharged and/or until a given switch-off period has elapsed.

15. The bridge according to claim 14, wherein, in response to receiving a notification of a neighboring service bridge node staying switched off, the service bridge node is configured to switch on and switch off in place of the neighboring service bridge node.

16. The bridge according to claim 1, wherein each of the service bridge nodes comprises:
  an analog converter for converting the plurality of cell signals between the service link frequency band and the bridge link frequency band; and
  a reference oscillator circuit configured to determine an oscillator reference signal on the basis of a reference signal derived from a downlink cell signal;
  wherein the control circuit of each of the service bridge nodes is connected to the reference oscillator circuit of the service bridge node and is configured to:
    receive the oscillator reference signal determined by the reference oscillator circuit; and
    control the analog converter on the basis of the determined oscillator reference signal,
  wherein the reference signal derived by the reference oscillator circuit of each of the service bridge nodes from the downlink cell signal comprises an oscillator reference signal inserted by the donor bridge node in-band to one or more downlink plurality of cell signals, and
  wherein the oscillator reference signal inserted by the donor bridge node control circuits a difference between local oscillator frequencies of the donor bridge node and the service bridge node for minimizing a difference between a carrier frequency, $f_{1,dl}$, of the cell signal at the base station pooling location and the service link carrier frequency, $f'_{1,dl}$, of the cell signal.

17. A method for a bridge comprising a donor bridge node and one or more service bridge nodes, comprising:
  connecting, by the donor bridge node, to a base station pooling location comprising plurality of cell signals;
  determining, by the donor bridge node, for each of the plurality of cell signals a service link carrier frequency in a service link frequency band and a bridge link carrier frequency in a bridge link frequency band;
  associating, by the donor bridge node, each of the plurality of cell signals and the determined carrier frequencies in the bridge link frequency band and the service link frequency band with the one or more service bridge nodes;
  communicating, by the donor bridge node, each of the plurality of cell signals, with the one or more service bridge nodes associated with each cell signal, at the bridge link carrier frequency of the cell signal in the bridge link frequency band; and
  communicating, by the one or more service bridge nodes, with the donor bridge node at the bridge link carrier frequency of the bridge link frequency band and with user equipment at the service link carrier frequency of the service link frequency band associated with one of the plurality of cell signals.

18. The method according to claim 17, comprising:
  converting, by an analog converter of the donor bridge node, the plurality of cell signals between the service link carrier frequency in the service link frequency band and the bridge link carrier frequency in the bridge link frequency band, wherein the converting comprises determining an oscillator reference signal on the basis of at least one of:
    an external calibrated reference signal,
    frequency offset estimation of downlink plurality of cell signals, and
    a signal from a Global Navigation Satellite Service (GNSS);
  receiving, by a control circuit of the donor bridge node connected to the reference oscillator circuit, the oscillator reference signal determined by the reference oscillator circuit; and
  controlling, by the control circuit of the donor bridge node, the analog converter of the donor bridge node on the basis of the determined oscillator reference signal.

19. The method according to claim 17, comprising:
  converting, by an analog converter of each of the service bridge nodes, the plurality of cell signals between the service link frequency band and the bridge link frequency band;
  determining, by a reference oscillator circuit of the analog converter of each of the service bridge nodes, an oscillator reference signal on the basis of:
  a reference signal derived from a downlink cell signal, wherein the reference signal derived by the reference oscillator circuit of each of the service bridge nodes from the downlink cell signal comprises an oscillator reference signal inserted by the donor bridge node in-band to one or more downlink plurality of cell signals;
  receiving, by a control circuit of each of the service bridge nodes connected to the reference oscillator circuit, the oscillator reference signal determined by the reference oscillator circuit; and
  controlling, by the control circuit of each of the service bridge nodes, the analog converter of the service bridge node, on the basis of the determined oscillator reference signal.

* * * * *